US011536812B2

(12) United States Patent
Fu et al.

(10) Patent No.: US 11,536,812 B2
(45) Date of Patent: Dec. 27, 2022

(54) INCREASED DYNAMIC RANGE FOR TIME-OF-FLIGHT (TOF) LIDAR SYSTEMS

(71) Applicant: Aptiv Technologies Limited, St. Michael (BB)

(72) Inventors: Geng Fu, Belmont, MA (US); Chenghui Hao, Cambridge, MA (US); Denis Rainko, Essen (DE); Ali Haddadpour, Boston, MA (US); Roman Dietz, Berlin (DE)

(73) Assignee: Aptiv Technologies Limited, St. Michael (BB)

( * ) Notice: Subject to any disclaimer, the term of this patent is extended or adjusted under 35 U.S.C. 154(b) by 305 days.

(21) Appl. No.: 16/909,788

(22) Filed: Jun. 23, 2020

(65) Prior Publication Data

US 2021/0396857 A1  Dec. 23, 2021

(51) Int. Cl.
*G01S 7/48* (2006.01)
*G01S 7/4865* (2020.01)
*G01S 17/931* (2020.01)
*G01S 17/894* (2020.01)

(52) U.S. Cl.
CPC .......... *G01S 7/4865* (2013.01); *G01S 17/894* (2020.01); *G01S 17/931* (2020.01)

(58) Field of Classification Search
CPC ...... G01S 7/4865; G01S 7/4868; G01S 7/486; G01S 7/484; G01S 7/489; G01S 7/4817; G01S 7/4861; G01S 17/4817; G01S 17/58; G01S 17/894; G01S 17/931
See application file for complete search history.

(56) References Cited

U.S. PATENT DOCUMENTS

| | | | | |
|---|---|---|---|---|
| 3,675,190 A | * | 7/1972 | Auer, Jr. | G01S 7/527 367/93 |
| 3,897,150 A | * | 7/1975 | Bridges | G01S 17/10 348/138 |
| 5,691,808 A | * | 11/1997 | Nourrcier, Jr. | G01S 7/497 356/5.1 |
| 6,522,396 B1 | * | 2/2003 | Halmos | G01S 17/10 382/106 |

(Continued)

OTHER PUBLICATIONS

"Extended European Search Report", EP Application No. 21180090.9, dated Nov. 18, 2021, 9 pages.

*Primary Examiner* — Jefferey F Harold
*Assistant Examiner* — Timothy R Newlin
(74) *Attorney, Agent, or Firm* — Sawtooth Patent Group PLLC

(57) ABSTRACT

This document describes techniques and systems to increase the dynamic range of time-of-flight (ToF) lidar systems. The described lidar system adjusts, based on the energy of a first return pulse, the bias voltage of a photodetector for other return pulses of the object pixel. The bias voltage can be adjusted down for highly-reflective or close-range objects. Similarly, the bias voltage can be increased for low-reflectivity or long-range objects. The ability of the described lidar system to adjust the bias voltage of the photodetector for each object pixel increases the dynamic range of the lidar system without additional hardware or a complex readout. The increased dynamic range allows the described lidar system to maintain a long-range capability, while accurately measuring return-pulse intensity for detecting close-range or highly-reflective objects.

20 Claims, 7 Drawing Sheets

(56) References Cited

U.S. PATENT DOCUMENTS

| | | | |
|---|---|---|---|
| 9,529,079 B1* | 12/2016 | Droz | H04N 5/37455 |
| 2007/0182949 A1* | 8/2007 | Niclass | G01S 7/491 |
| | | | 356/3 |
| 2012/0261516 A1 | 10/2012 | Gilliland et al. | |
| 2016/0181459 A1 | 6/2016 | Birk et al. | |
| 2016/0306032 A1* | 10/2016 | Schwarz | G01S 7/497 |
| 2017/0031009 A1* | 2/2017 | Davidovic | G01S 7/4865 |
| 2017/0180658 A1* | 6/2017 | Choi | G01S 7/497 |
| 2017/0372677 A1* | 12/2017 | Chang | H01L 27/1218 |
| 2018/0031420 A1 | 2/2018 | Dyba | |
| 2019/0064922 A1 | 2/2019 | Price et al. | |
| 2019/0643341 | 2/2019 | Russell et al. | |
| 2019/0094361 A1 | 3/2019 | Onal et al. | |
| 2019/0271767 A1* | 9/2019 | Keilaf | G01S 7/4815 |
| 2021/0270965 A1* | 9/2021 | Liu | G01S 7/4814 |
| 2021/0311174 A1* | 10/2021 | Jiang | G01S 7/4861 |
| 2021/0341582 A1* | 11/2021 | Clifton | G01S 17/42 |
| 2021/0356735 A1* | 11/2021 | Almeida | G01S 7/4813 |

* cited by examiner

US 11,536,812 B2

INCREASED DYNAMIC RANGE FOR TIME-OF-FLIGHT (TOF) LIDAR SYSTEMS

BACKGROUND

Automotive lidar systems use laser signals to determine the speed and distance of stationary and moving objects (e.g., other vehicles, pedestrians, obstacles). Lidar systems compare emitted transmit signals to reflected return signals to make these measurements. For long-range applications, it is desirable to increase the dynamic range of a lidar system. In particular, a larger dynamic range allows the lidar system to increase its low-light detection capability, while maintaining accurate reflectivity measurements for short-range objects. For time-of-flight lidar systems in particular, increasing the dynamic range may require more complex and expensive hardware and processing ability.

SUMMARY

This document describes techniques and systems to increase the dynamic range of time-of-flight (ToF) lidar systems. The described lidar system adjusts, based on the energy of a first return pulse, the bias voltage of a photodetector for other return pulses of the object pixel. The bias voltage can be adjusted down for highly-reflective or close-range objects. Similarly, the bias voltage can be increased for low-reflectivity or long-range objects. The ability of the described lidar system to adjust the bias voltage of the photodetector for each object pixel increases the dynamic range of the lidar system without additional hardware or a complex readout. The increased dynamic range allows the described lidar system to maintain a long-range capability, while accurately measuring return-pulse intensity for detecting close-range or highly-reflective objects.

For example, this document describes transceiver functions to increase dynamic range for ToF lidar systems. The described transceiver transmits at least two pulses for each object pixel within a field-of-view of the lidar system. The energy of the first pulse is lower than the energy of the other pulses of the at least two pulses in each object pixel. The system receives at least two return pulses. The return pulses are reflections of the transmitted pulses. Based on an energy of a first return pulse, the transceiver adjusts a bias voltage of its photodetector before receiving other return pulses of the object pixel. The transceiver outputs the return pulses obtained by the photodetector to a processor of the lidar system.

This document also describes means for performing methods of the above-summarized system and other methods set forth herein, as well as methods performed by these lidar systems.

This summary introduces simplified concepts for increased dynamic range for a ToF lidar system, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of increasing the dynamic range of ToF lidar systems are described in this document with reference to the following figures. The same numbers are often used throughout the drawings to reference like features and components:

FIG. 3-1 illustrates an example operation of a ToF lidar system with an increased dynamic range;

FIG. 3-2 illustrates the object pixels scanned by a ToF lidar system during a frame;

DETAILED DESCRIPTION

Overview

Figure 1:
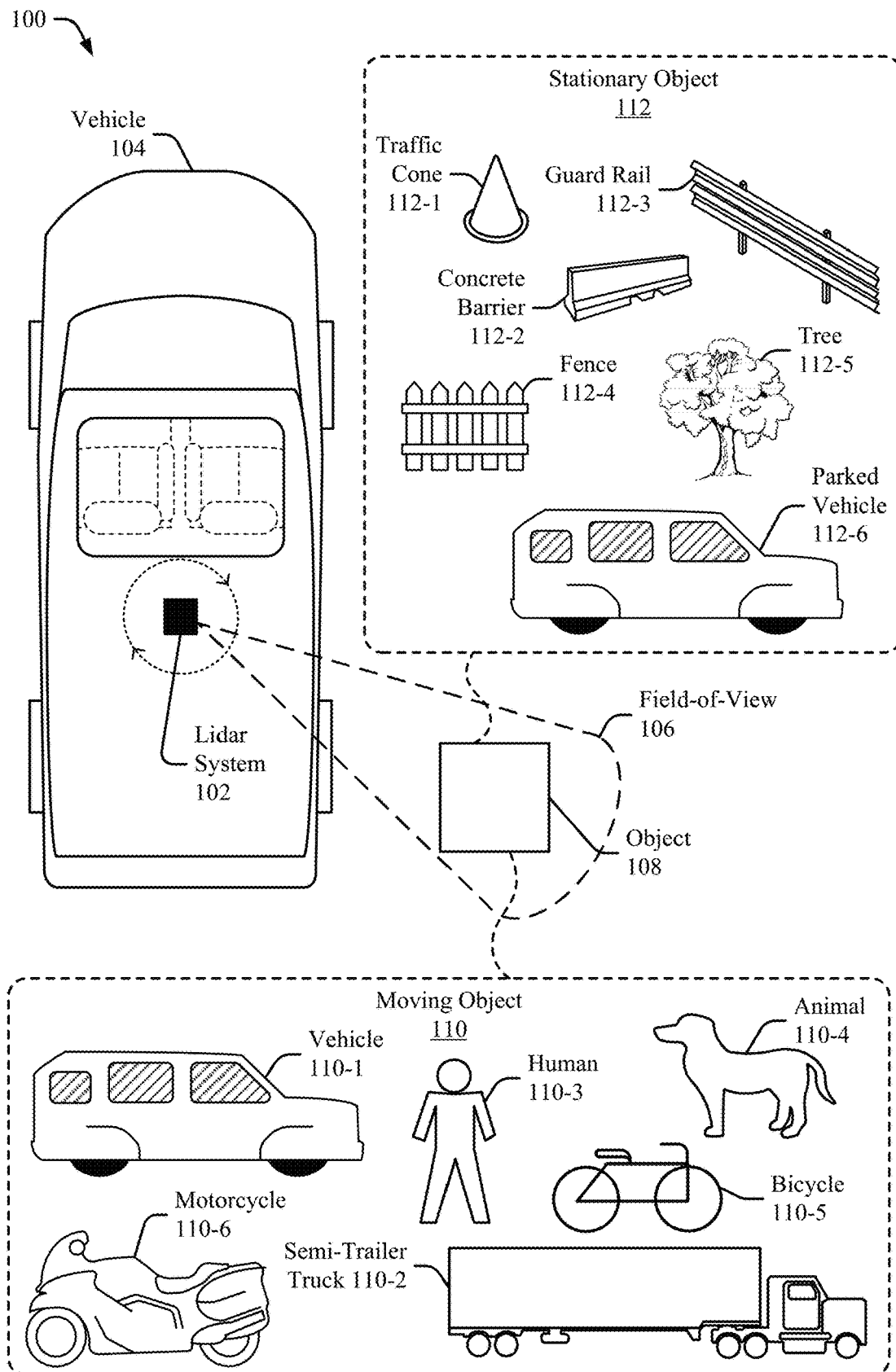
FIG. 1 illustrates an example environment in which a ToF lidar system with an increased dynamic range can be implemented.

Automotive lidar systems are an important sensing technology that some vehicle-based systems rely on to acquire critical information about the surrounding environment. A lidar system has a field-of-view that represents a volume of space within which it looks for nearby objects. The field-of-view is composed of a large number of object pixels (e.g., one million object pixels). The time it takes the lidar system to scan each object pixel (e.g., collect information for all of the object pixels) within the field-of-view is a frame. By scanning each object pixel in a sequence of frames, a ToF lidar system can determine range and reflectivity information of nearby objects.

A ToF lidar system scans each object pixel by emitting one or more laser pulses and detecting a reflection of the one or more pulses. The ability of a lidar system to accurately process reflected return signals from objects at a close-range versus a long-range, or with high-reflectivity versus low-reflectivity, is represented by the dynamic range of the system. It is generally measured as the ratio between the maximum and minimum energy received by the lidar system that produces an accurate output. Many automotive applications require lidar systems with a large dynamic range. A larger dynamic range, for example, improves the low-light detection capability (e.g., for a distant or low-reflectivity object) of the lidar system, while maintaining accurate measurements in short-range or high-reflectivity situations. Increasing the dynamic range, however, can increase the hardware cost or readout complexity of the lidar system.

Some lidar systems include at least two types of photodetectors (e.g., sensors) with different photo sensitivities to increase the dynamic range. The lidar system includes a first set of photodetectors with a relatively-high sensitivity and a second set with a lower sensitivity. The readout of these lidar systems includes data from multiple types of photodetectors. In addition to the cost associated with multiple types of photodetectors, the output of these lidar systems is more complex and requires additional signal processing.

Other lidar systems use complex systems to adjust the bias voltage of a photodetector to increase the dynamic range. In one such system, the photodetector is operated in different modes by adjusting the bias voltage. In another system, the bias voltage of the photodetector is proportionally adjusted based on the time-of-flight between the emission of the transmit signal and the reception of the return signals. Each of these systems can increase the dynamic range of a lidar system but require additional hardware, a high-bandwidth power controller, and complex readouts to achieve this result.

In contrast to those lidar systems, this document describes techniques and systems to increase the dynamic range of a lidar system without adding additional hardware and/or complex readouts. The described lidar system includes a transmitter configured to transmit at least two pulses for each object pixel. The first pulse of the at least two pulses has less energy than the peak output of the other pulses of the same object pixel. The lidar system also includes a receiver configured to receive at least two return pulses, which are reflections of the transmitted pulses. The receiver is configured to adjust, based on the energy of the first return pulse, a bias voltage of a photodetector for the other return pulses of the object pixel. The return pulses are then output. By dynamically adjusting the bias voltage of the photodetector object pixel-by-object pixel based on the energy of the first return pulse, the described lidar system has an increased dynamic range without requiring additional hardware or complex readouts. With an increased dynamic range, a ToF lidar system can provide a vehicle system (e.g., a collision-avoidance system) lidar data for objects in the surrounding environment at a greater range of distances and reflectivity.

This is just one example of how the described techniques and systems increase the dynamic range for ToF lidar systems. This document describes other examples and implementations.

Operating Environment

FIG. 1 illustrates an example environment 100 in which techniques using, and an apparatus including, a ToF lidar system 102 with an increased dynamic range can be implemented. The ToF lidar system 102 can be referred to simply as "the lidar system 102". In the depicted environment 100, the lidar system 102 is mounted to, or integrated within, a vehicle 104. The lidar system 102 is capable of detecting one or more objects 108 that are in proximity to the vehicle 104. Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In some cases, the vehicle 104 can tow or include a trailer or other attachments. In general, manufacturers can mount the lidar system 102 to any moving platform, including moving machinery or robotic equipment.

Figure 2:
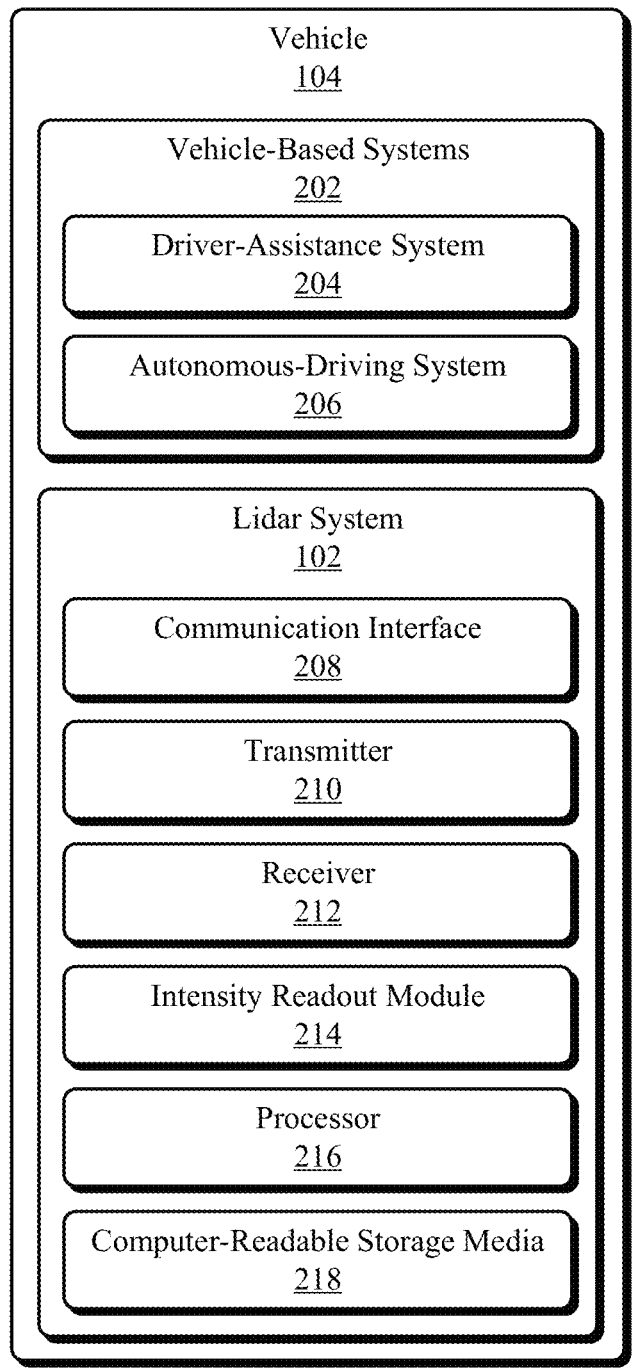
FIG. 2 illustrates an example implementation of the ToF lidar system as part of a vehicle.
Figures 1, 3:
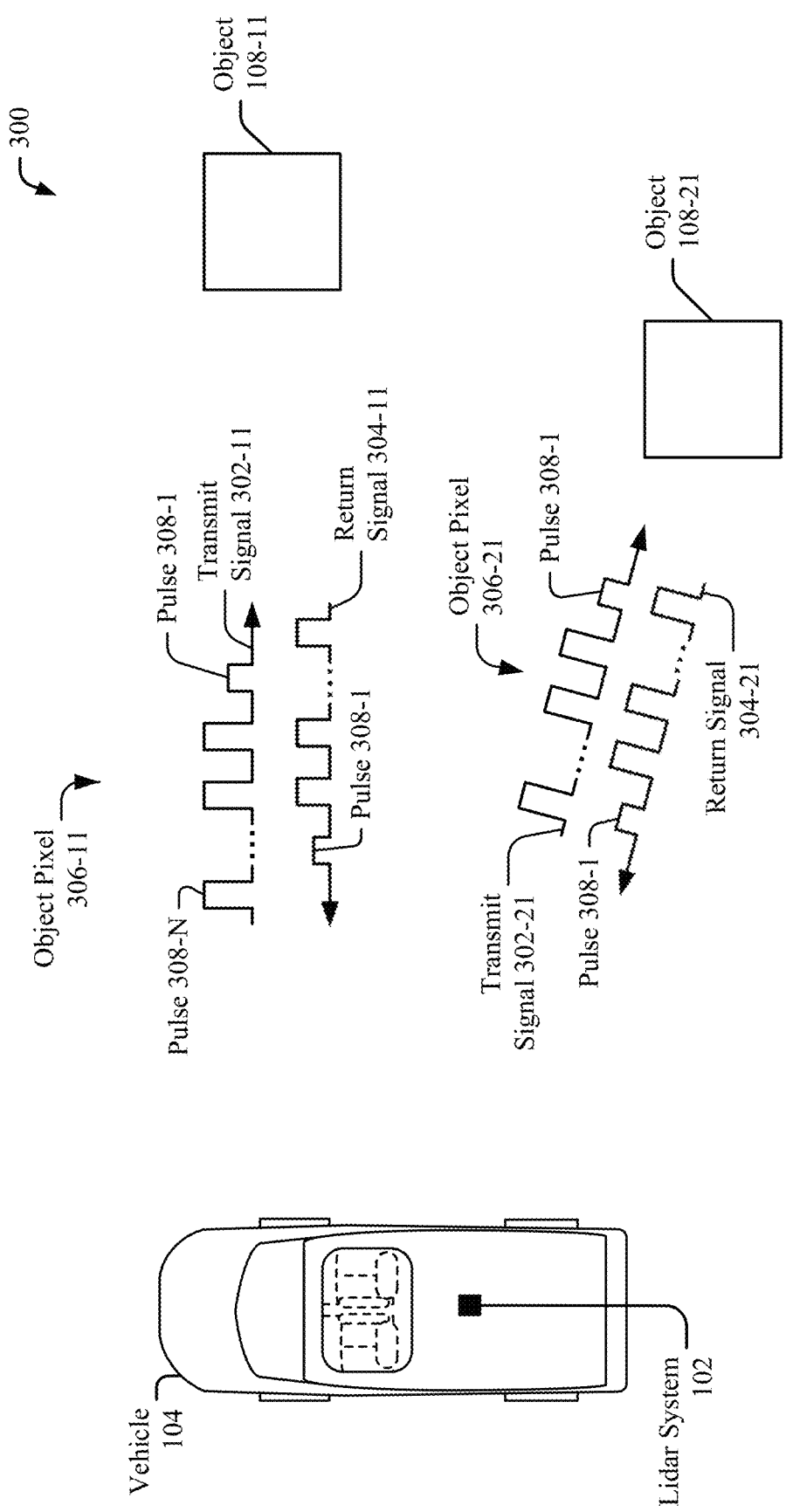
Figures 2, 3:
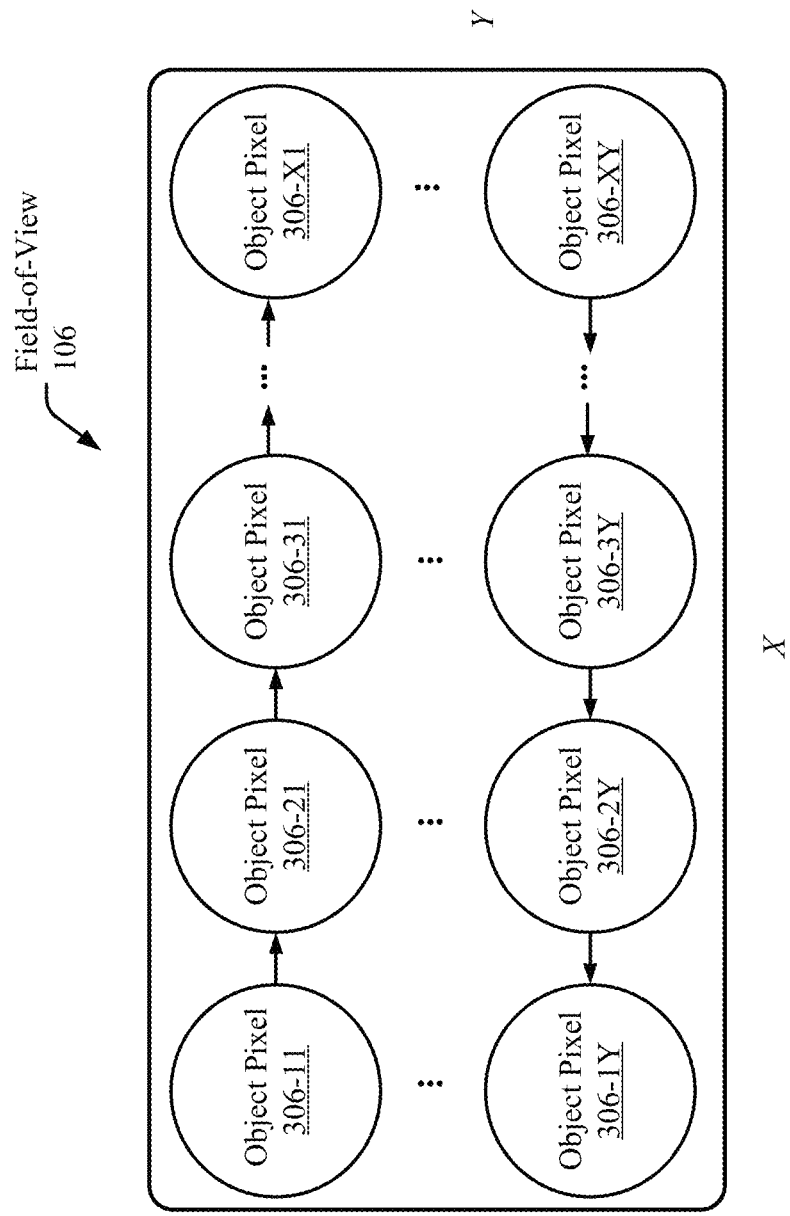

In the depicted implementation, the lidar system 102 is mounted on the roof of the vehicle 104 and provides a field-of-view 106 illuminating the object 108. The lidar system 102 divides the field-of-view 106 into object pixels (as illustrated in FIG. 3-2). The lidar system 102 can project the field-of-view 106 from any exterior surface of the vehicle 104. For example, vehicle manufacturers can integrate the lidar system 102 into a bumper, side mirror, or any other interior or exterior location where the distance or classification of the object 108 requires detection. In some cases, the vehicle 104 includes multiple lidar systems 102, such as a first lidar system 102 and a second lidar system 102 that together provide a larger field-of-view 106. In general, vehicle manufacturers can design the locations of the one or more lidar systems 102 to provide a particular field-of-view 106 that encompasses a region of interest in which the object 108 may be present. Example fields-of-view 106 include a 360-degree field-of-view, one or more 180-degree fields-of-view, one or more 90-degree fields-of-view, and so forth, which can overlap or be combined into a field-of-view 106 of a particular size.

The object 108 is composed of one or more materials that reflect lidar signals. Depending on the application, the object 108 can represent a target of interest. In some cases, the object 108 is a moving object 110, such as another vehicle 110-1, a semi-trailer truck 110-2, a human 110-3, an animal 110-4, a bicycle 110-5, or a motorcycle 110-6. In other cases, the object 108 represents a stationary object 112, such as a traffic cone 112-1, a concrete barrier 112-2, a guard rail 112-3, a fence 112-4, a tree 112-5, or a parked vehicle 112-6. The stationary object 112 can be continuous (e.g., the concrete barrier 112-2, the guard rail 112-3) or discontinuous (e.g., the traffic cone 112-1) along a portion of the road.

The lidar system 102 represents a time-of-flight lidar system, which transmits and receives lidar signals comprised of pulses for each object pixel of the field-of-view 106. The lidar system 102 measures a distance to the object 108 based on the time it takes for the pulses to travel from the lidar system 102 to the object 108, and from the object 108 back to the lidar system 102. The lidar system 102 can also measure reflective properties of the object 108 based on the energy of the received pulses. Information about this energy can be used to classify the object 108. As an example, the lidar system 102 can determine whether the object 108 is a parked vehicle 112-6, a lane marker, a surface of a road, or a human 110-3. The energy information also enables the lidar system 102 to determine a characteristic of the object 108, such as a material composition of the object 108. The lidar system 102 and the vehicle 104 are further described with respect to FIG. 2.

FIG. 2 illustrates the lidar system 102 as part of the vehicle 104. The vehicle 104 also includes at least one vehicle-based system 202 that rely on data from the lidar system 102, such as a driver-assistance system 204 and an autonomous-driving system 206. Generally, the vehicle-based systems 202 use lidar data provided by the lidar system 102 to perform a function. For example, the driver-assistance system 204 provides blind-spot monitoring and generates an alert that indicates a potential collision with an object 108 that is detected by the lidar system 102. In this case, the lidar data from the lidar system 102 indicates when it is safe or unsafe to change lanes.

As another example, the driver-assistance system 204 suppresses alerts responsive to the lidar system 102, indicating that the object 108 represents a stationary object 112, such as a road barrier. In this way, the driver-assistance system 204 can avoid annoying the driver with alerts while the vehicle 104 is driving next to the road barrier. Suppressing alerts can also be beneficial in situations in which reflections from the road barrier generate false detections that appear to be moving objects. By suppressing the alerts, these false detections will not cause the driver-assistance system 204 to alert the driver.

The autonomous-driving system 206 may move the vehicle 104 to a particular location on the road while avoiding collisions with objects 108 detected by the lidar system 102. The lidar data provided by the lidar system 102 can provide information about distance and reflectivity of the objects 108 to enable the autonomous-driving system 206 to perform emergency braking, perform a lane change, or adjust the speed of the vehicle 104.

The lidar system 102 includes a communication interface 208 to transmit the lidar data to the vehicle-based systems 202 or another component of the vehicle 104. The communication interface 208 can transmit the data over a communication bus of the vehicle 104, for example, when the individual components of the lidar system 102 are integrated within the vehicle 104. In general, the lidar data provided by the communication interface 208 is in a format usable by the vehicle-based systems 202. In some implementations, the communication interface 208 can send information to the lidar system 102, such as the speed of the vehicle 104 or whether a turn blinker is on or off. The lidar system 102 uses this information to configure itself appropriately. For example, the lidar system 102 can adjust its frame rate or scanning speed based on the speed of the vehicle 104. Alternatively, the lidar system 102 can dynamically adjust the field-of-view 106 based on whether a right-turn blinker or a left-turn blinker is on.

The lidar system 102 also includes a transmitter 210 to transmit lidar signals and a receiver 212 to receive reflected versions of these lidar signals. The transmitter 210 includes elements, whether optical or otherwise, for emitting lidar signals and related components for directing the lidar signals. The transmitter 210 can form beams that are steered or un-steered, and wide or narrow. The steering and shaping can be achieved through analog beamforming or digital beamforming. The receiver 212 includes one or more photodetector arrays (collectively, referred to as a photodetector) to detect the reflected lidar signals. The photodetector can be implemented as a silicon photomultiplier (SiPM), an avalanche photodiode (APD), a single-photon avalanche diode (SPAD), a photomultiplier tube (PMT), or a PIN diode. A PIN diode includes an undoped intrinsic semiconductor region in between a p-type and n-type semiconductor region. The transmitter 210 and receiver 212 can be incorporated together on the same integrated circuit (e.g., a transceiver integrated circuit) or separately on different integrated circuits.

The lidar system 102 also includes one or more processors 216 and computer-readable storage media (CRM) 218. The processor 216 can be implemented as a microprocessor or a system-on-chip. The processor 216 executes instructions that are stored within the CRM 218. As an example, the processor 216 can determine a location of the object 108 (of FIG. 1) relative to the lidar system 102 (e.g., determine a slant range, azimuth, and elevation to the object 108), determine the material composition of the object 108, or classify the object 108. In general, the processor 216 determines characteristics of the object 108 based on information provided by the receiver 212. The processor 216 also generates lidar data for the vehicle-based systems 202.

The lidar system 102 also includes an intensity readout module 214. The intensity readout module 214 provides an interface between the receiver 212 and the processor 216. In some implementations, the intensity readout module 214 is incorporated within the receiver 212 and implemented on the same integrated circuit. The intensity readout module 214, however, may be separate from the receiver 212 and implemented on a different integrated circuit (or multiple integrated circuits), and in some implementations, at least a portion of the intensity readout module 214 can be implemented by the processor 216.

Generally, the intensity readout module 214 extracts information from analog signals output by the receiver 212 and generates digital information for the processor 216. The intensity readout module 214 also includes means to control a bias voltage of the photodetector within the receiver 212.

The lidar system 102 can include a timing readout module (not shown), which generates timing data related to the time-of-flight for the return signals. For example, a timing readout module can determine times associated with a voltage or current of a pulse in a return signal being greater than, equal to, or less than a threshold value.

FIG. 3-1 illustrates an example operation of the lidar system 102 with an increased dynamic range. In the environment 300 of FIG. 3-1, objects 108-11 and 108-21 (collectively, the objects 108) are located at a particular range and angle from the lidar system 102. To detect the objects 108, the lidar system 102 emits a transmit signal 302 for each of the object pixels 306.

As a reference, FIG. 3-2 illustrates the object pixels 306 of the field-of-view 106 scanned by the lidar system 102 during a frame (not shown). The field-of-view 106 includes the object pixels 306-11, 306-21, 306-31, . . . , 306-X1, . . . , 306-XY, 306-3Y, 306-2Y, 306-1Y, and all other object pixels scanned during the frame. The object pixels 306 are shown arranged in an X-pixel-wide-by-Y-pixel-high grid and are scanned individually in the order indicated by the arrows, one row (or column) at a time, although other orders for scanning the object pixels 306 are possible.

Referring back to FIG. 3-1, the transmit signal 302 includes multiple pulses 308, such as pulses 308-1 to 308-N in a pulse train, where N represents a positive integer, for each object pixel 306. The energy of the first pulse 308-1 (e.g., the intensity or power level of the pulse) is lower than the energy of the other pulses 308-2 to 308-N in the pulse train. The energy of the first pulse 308-1 can be, for example, a fraction or percentage (e.g., twenty, thirty, forty, or fifty percent) lower than the energy of the other pulses 308-2 to 308-N, which can be used to detect low-reflectivity or long-range objects. The energy of the first pulse 308-1 can be based on the photosensitivity of the photodetector or the desired range of the lidar system 102. In addition, the lidar system 102 can tailor the number of pulses 308 for each of the transmit signals 302 and the transmission characteristics of the pulses 308 (e.g., pulse width, time interval between each pulse 308, energy level) to achieve a particular scanning speed, detection range, or range resolution.

In the depicted example, the lidar system 102 emits transmit signals 302-11 and 302-21, in the object pixels 306-11 and 306-21, respectively. The transmit signals 302-11 and 302-21 are collectively the transmit signal 302. The lidar system 102 sequentially scans the object pixels 306 within the field-of-view 106. A frame (not shown) represents the time it takes to scan all the individual object pixels 306 within the field-of-view 106.

At least a portion of the transmit signal 302-11 is reflected by the object 108-11. The reflected portion represents a return signal 304-11. The lidar system 102 receives the return signal 304-11 and processes the return signal 304-11 to extract lidar data regarding the object 108-11 for the vehicle-based systems 202. As depicted, the amplitude of the return signal 304-11 is smaller than the amplitude of the transmit signal 302-11 due to losses incurred during propagation and reflection.

Similarly, at least a portion of the transmit signal 302-21 is reflected by the object 108-21. The return signals 304-11 and 304-21 are collectively the return signal 304. The lidar system 102 receives the return signal 304-21 and processes it to extract lidar data regarding the object 108-21 for the vehicle-based systems 202.

In the depicted example, the amplitude of the return signal 304-21 is larger than the amplitude of the return signal 304-11. The difference in the amplitudes of the return signals 304 can be due to the distance of the objects 108 from the lidar system 102 or the reflectivity of the objects 108. As an example, the object 108-21 is closer to the lidar system 102 than the object 108-11 and the objects 108-11 and 108-21 have similar reflectivity. As another example, the objects 108-11 and 108-21 can be located at approximately the same distance from the lidar system 102 and the amplitude of the return signal 304-21 is larger than the return signal 304-11 because the object 108-21 has a higher reflectivity than the object 108-11.

At the lidar system 102, the return signals 304-11 and 304-21 represent a delayed version of the transmit signals 302-11 and 302-21, respectively. The amount of delay is proportional to the range (e.g., distance) from the objects 108-11 and 108-21 to the lidar system 102. For example, the delay represents the time it takes the transmit signal 302-11 to propagate from the lidar system 102 to the object 108-11 and for the return signal 304-11 to travel back to the lidar system 102. Like the transmit signals 302, the return signals 304 are composed of multiple pulses 308. The reception and processing of the return signal 304 by the lidar system 102 is described in more detail with respect to FIG. 4.

Figure 4:
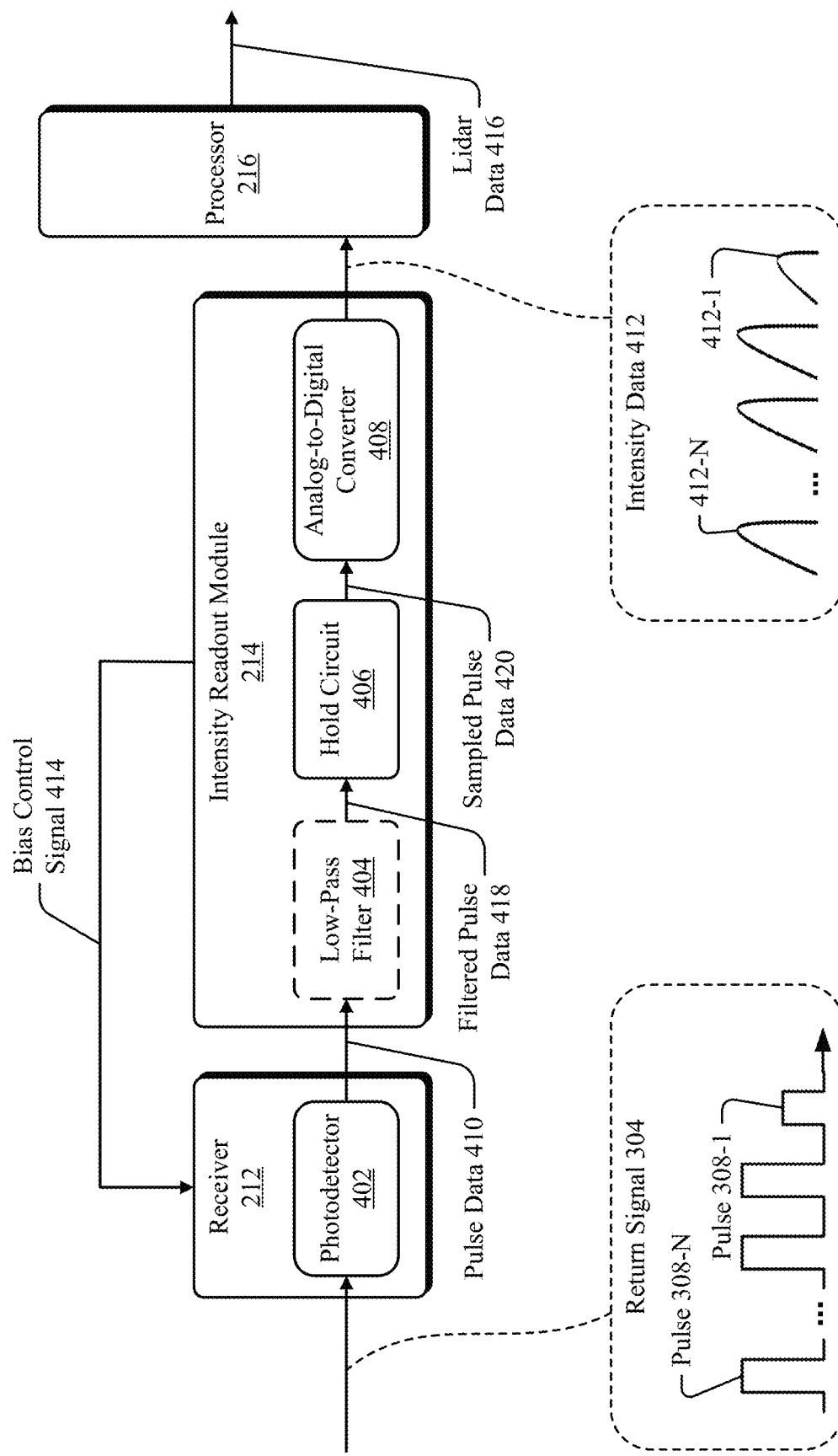
FIG. 4 illustrates an example receiver, intensity readout module, and processor of the described lidar system.

FIG. 4 illustrates an example receiver 212, intensity readout module 214, and processor 216 of the lidar system 102. In the depicted configuration, the intensity readout module 214 is coupled between the receiver 212 and the processor 216.

The receiver 212 includes at least one photodetector 402. Although not explicitly shown, the receiver 212 can include other elements, such as an amplifier.

The photodetector 402 detects the reflected return signals 304 by collecting photons contained in the pulses 308. The photodetector 402 converts the photons into an analog current flow. In the case of the photodetector 402 being an APD, SiPM, or SPAD array, the photodetector 402 pulls electrons created by photon absorption towards a multiplication area where a photon-induced electron is amplified to create a breakdown avalanche of multiplied electrons. In a linear-output region of the photodetector 402, the output of the photodetector linearly increases based on the number of incident photons in a pulse 308. As the number of photons incident on the photodetector 402 increases, the output of the photodetector becomes non-linear and is not proportional to the number of photons received. In the non-linear region of the photodetector 402, the accuracy of range and reflectivity determinations by the lidar system 102 decreases because the lidar system 102 may not be able to determine the time-of-flight or the intensity information for the return signal 304. Generally, the non-linear region of the photodetector 402 begins at approximately seventy percent of the maximum incident-energy capacity of the photodetector 402.

The sensitivity of the photodetector 402 to photons in the return signal 304 can be adjusted by its bias voltage. An increase of the bias voltage increases the sensitivity of the photodetector 402 to return signals 304 with low energy (e.g., reflected by an object 108 at a great distance from the lidar system 102 or with a low-reflectivity). Similarly, a decrease of the bias voltage decreases the sensitivity of the photodetector 402 to return signals with high energy.

The intensity readout module 214 extracts information from the analog current-flow output by the receiver 212 and generates digital information for the processor 216. As described above with respect to FIG. 2, the intensity readout module 214 can be incorporated as part of the receiver 212 or implemented as a separate component in the lidar system 102. The intensity readout module 214 includes a hold circuit 406 and an analog-to-digital converter 408. The intensity readout module 214 can also include a low-pass filter 404.

The low-pass filter 404 can be coupled between the receiver 212 and the hold circuit 406 or coupled between the hold circuit 406 and the analog-to-digital converter 408. The low-pass filter 404 attenuates high-frequency noise. By attenuating the noise, the low-pass filter 404 improves a measurement accuracy of the lidar system 102.

The hold circuit 406 is coupled between the receiver 212 and the analog-to-digital converter 408. The hold circuit 406 samples the analog signal. In particular, the hold circuit 406 holds the analog signal for a specified duration and samples the signal. The hold duration and sampling rate of the hold circuit 406 can be pre-programmed or controlled by the processor 216. The hold circuit 406 can be implemented, for example, as an integrate-and-hold circuit or a peak-and-hold circuit. An integrate-and-hold circuit measures an amount of charge within a pulse 308 (e.g., measures an amount of current or voltage over time) and generates a voltage, which represents the energy of the pulse 308. A peak-and-hold circuit measures a peak amplitude of a current or voltage across the pulse 308 and generates a voltage, which represents the energy of the pulse 308.

The analog-to-digital converter 408 is coupled between the hold circuit 406 and the processor 216. The analog-to-digital converter 408 collects one or more samples of the output voltage from the hold circuit 406 and generates intensity data 412, which indicates the energy of the pulse 308. The intensity data 412 represents a scaled quantity of photons received by the photodetector 402 within a pulse 308 of the return signal 304. The intensity data 412 can be output to the processor 216 as a consolidated signal for each of the pulses 308 for an object pixel 306. For example, the intensity data 412 can be collected into a consolidated signal for pulse 308-1 to pulse 308-N of object pixel 306-11 by the analog-to-digital converter 408 or another component of the intensity readout module 214, such as a buffer, and then sent to the processor 216 once the intensity data for each pulse 308 of the object pixel 306-11 is collected.

The processor 216 analyzes the intensity data 412 associated with the pulses 308-1 to 308-N to detect the object 108. The processor 216 can use the intensity data 412-1 to 412-N to determine a material composition of the object 108 and/or classify the object 108. In addition, the processor 216 can use timing data obtained from the pulse data 410 to measure a distance between the lidar system 102 and the object 108. Information regarding the distance and classification of the object 108 can be provided as lidar data 416 to the vehicle-based systems 202 of FIG. 2.

A controller (not shown) of the intensity readout module 214 can control the bias voltage of the photodetector 402. The controller can be implemented using hardware, software, firmware, or a combination thereof in the intensity readout module 214. In other cases, the controller can be included within the photodetector 402 or the receiver 212. The controller generates a bias control signal 414, which is provided to the receiver 212. In this way, the bias voltage of the photodetector 402 can be dynamically adjusted by the controller based on the energy of the first pulse 308-1 of each object pixel 306.

During operation, the receiver 212 receives the return signal 304 and provides it to the photodetector 402. The return signal 304 includes multiple pulses 308, such as pulses 308-1 to 308-N. The photodetector 402 converts photons in the pulse 308 into pulse data 410. The pulse data 410 represents an analog current-flow response of the photodetector 402 to the pulse 308 in the time domain.

The pulse data 410 can be filtered by the low-pass filter 404. The pulse data 410 or the filtered pulse data 418 is input to the hold circuit 406. The hold circuit 406 samples the pulse data 410 or the filtered pulse data 418 and outputs sampled pulse data 420. The analog-to-digital converter 408 converts the sampled pulse data 420 into digital intensity data 412.

Based on the intensity data 412, the bias control signal 414 can be provided to the receiver 212. The bias control signal 414 directs the receiver 212 to increase or decrease the bias voltage of the photodetector 402 for the subsequent pulses 308-2 to 308-N of the object pixel 306 (e.g., the object pixel 306-11), as described in more detail with respect to FIG. 5. The bias voltage of the photodetector 402 is reset to a default voltage for the first pulse 308-1 of the subsequent object pixel 306 (e.g., the object pixel 306-21).

Figure 5:
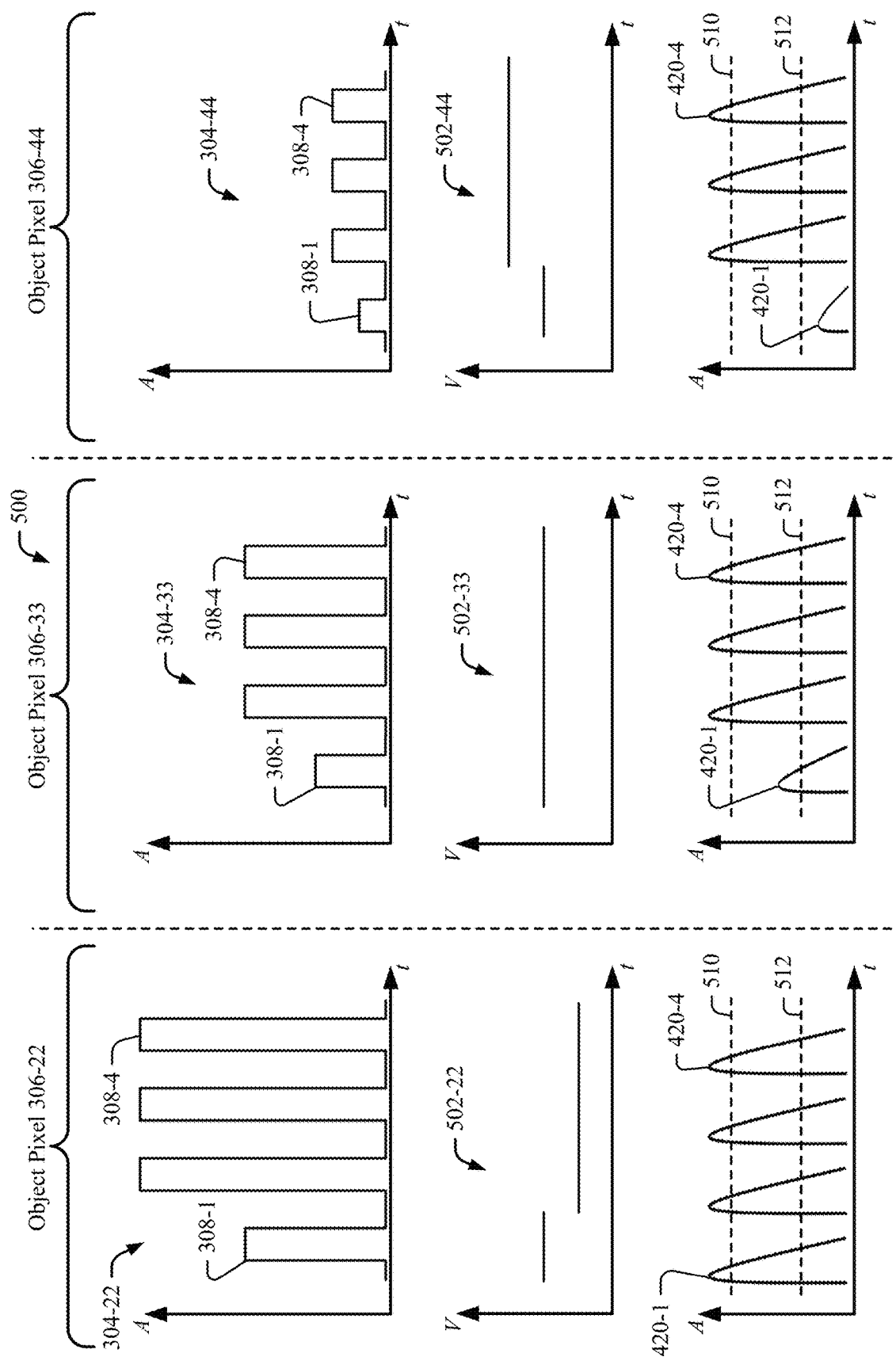
FIG. 5 illustrates an example environment within which a receiver and an intensity readout module of the described lidar system operates.

FIG. 5 illustrates an example environment 500 in which the receiver 212 and the intensity readout module 214 of the lidar system 102 operate. Environment 500 can be the same as or different than the environment 300 of FIG. 3-1. In the environment 500, objects 108-22, 108-33, and 108-44 (not shown) are positioned at varying distances from the lidar system 102 and with varying reflectivity.

The transmitter 210 emits the transmit signals 302-22, 302-33, and 302-44 for the object pixels 306-22, 306-33, and 306-44, respectively. For each of the object pixels 306-22, 306-33, and 306-44, the transmit signal 302 includes the pulses 308-1, 308-2, 308-3, and 308-4. The energy of the first pulse 308-1 is lower than the energy of the other pulses 308-2 to 308-4. In the depicted example, the first pulse 308-1 of each transmit signal 302 has approximately half the energy of the other pulses 308-2 to 308-4. In other examples, each transmit signal 302 has more or less than half the energy of the other pulses 308-2 to 308-4.

At least a part of the transmit signals 302-22, 302-33, and 302-44 are reflected by the objects 108-22, 108-33, and 108-44, respectively. The reflected portions are received by the lidar system 102 as return signals 304-22, 304-33, and 304-44. A bias voltage 502 of the photodetector 402 is set at a default value for the first pulse 308-1 of each of the object pixels 306. As described with respect to FIG. 4, the photodetector 402 receives the return signal 304 and outputs pulse data 410 for the first pulse 308-1. The intensity readout module 214 processes the pulse data 410 for the first pulse 308-1 of each of the return signals 304. Based on the energy of the first pulse 308-1, the controller of the intensity readout module 214 or the receiver 212 outputs the bias control signal 414 to the receiver 212 to adjust the bias voltage 502 of the photodetector 402.

In the environment 500, the object 108-22 (not shown) is located near the lidar system 102 and/or has a high-reflectivity. The controller can determine whether a peak or energy of the sampled pulse data 420-1 exceeds an upper threshold 510. The upper threshold 510 can be based on an amplitude level or an energy level. For example, the controller can determine whether the amplitude value of the sampled pulse data 420-1 for the first pulse 308-1 exceeds the upper threshold 510. In another example, the controller can determine whether the energy of the sampled pulse data 420-1, which is represented by the area under the sampled pulse data 420-1, exceeds the upper threshold 510. In the depicted example, the amplitude of the sampled pulse data 420-1 for the first pulse 308-1 is above the upper threshold 510.

Because the sampled pulse data 420-1 exceeds the upper threshold 510, the controller outputs the bias control signal 414 to the receiver 212. As a result, the bias voltage 502-22 of the photodetector 402 is lowered for the other pulses 308-2 to 308-4 of the return signal 304-22. The bias voltage 502-22 can be lowered to a set voltage or by a set amount below the default bias voltage (e.g., approximately half the default bias voltage). The decrease of the bias voltage 502-22 for the other pulses 308-2 to 308-4 can be based on the ratio of the energy of the first pulse 308-1 to the other pulses 308-2 to 308-4 in the transmit signal 302. For example, if the energy of the first pulse 308-1 is a quarter of the energy of the other pulses 308-2 to 308-4 in the transmit signal 302, then the bias voltage 502-22 for the other pulses 308-2 to 308-4 can be lowered by twenty-five percent if the upper threshold 510 is exceeded.

In other cases, the bias voltage 502-22 is lowered linearly in proportion to the amount that the amplitude or energy of the sampled pulse data 420-1 exceeds the upper threshold 510. For example, if the amplitude of the sampled pulse data 420-1 is thirty-percent greater than the upper threshold 510, then the bias voltage 502-22 is lowered by thirty percent. The upper threshold 510 can also include multiple thresholds and the bias voltage 502-22 can be adjusted according to which upper thresholds are exceeded.

In the depicted example, the bias voltage 502-22 for the other pulses 308-2 to 308-4 in the object pixel 306-22 is lowered by approximately fifty percent. As a result, the sensitivity of the photodetector 402 is lowered by approximately fifty percent for the pulses 308-2 to 308-4. Despite the energy of the pulses 308-2 to 308-4 in the return signal 304-22 being greater, the energy of the sampled pulse data 420-2 to 420-4 for the pulses 308-2 to 308-4, respectively, is approximately the same as the energy of the sampled pulse data 420-1. Because the bias voltage 502-22 was lowered, the photodetector 402 received and processed the pulses 308-2 to 308-4 within its linear region.

The bias voltage 502 is adjusted to maintain operation of the lidar system 102 within the linear region of the photodetector 402. To this end, the value of the upper threshold 510 is set based on the maximum incident-energy capacity of the photodetector 402 and the ratio of transmit energy in the first pulse 308-1 to the other pulses 308-2 to 308-4. For example, the photodetector 402 operates in the linear region if the incident energy is less than approximately seventy percent of its maximum incident-energy capacity. Because the transmit energy of the first pulse 308-1 is approximately half of the transmit energy of the other pulses 308-2 to 308-4, the upper threshold 510 is approximately thirty-five percent of maximum incident-energy capacity of the photodetector 402.

In the environment 500, the object 108-33 (not shown) is located at a distance near the center of the range of the lidar system 102. The energy of the sampled pulse data 420-1 for the first pulse 308-1 of the return signal 304-33 is below the upper threshold 510 and above a lower threshold 512. As a result, the bias voltage 502-33 is unchanged for the other pulses 308-2 to 308-4 of the return signal 304-33 in the object pixel 306-33. The energy of the sampled pulse data 420-2 to 420-4 for the pulses 308-2 to 308-4, respectively, is approximately double the energy of the sampled pulse data 420-1, but still within the linear region of the photodetector 402.

The object 108-44 (not shown) is located far from the lidar system 102 and/or has a low-reflectivity. The energy of the sampled pulse data 420-1 for the first pulse 308-1 of the return signal 304-44 is below the lower threshold 512. As a result, the bias voltage 502-44 of the photodetector 402 is increased for the other pulses 308-2 to 308-4 of the return signal 304-44. The bias voltage 502-44 can be increased to a set voltage or by a set amount above the default bias voltage (e.g., approximately twice the default bias voltage). The increase of the bias voltage 502-44 for the other pulses 308-2 to 308-4 can be based on the ratio of the transmit energy of the first pulse 308-1 to the other pulses 308-2 to 308-4. For example, if the energy of the first pulse 308-1 is a quarter of the energy of the other pulses 308-2 to 308-4 in the transmit signal 302, then the bias voltage 502-44 for the other pulses 308-2 to 308-4 can be increased by twenty-five percent if the lower threshold 512 is not exceeded.

In other cases, the bias voltage 502-44 is increased linearly in proportion to the amount that the amplitude or energy of the sampled pulse data 420-1 is below the lower threshold 512. For example, if the amplitude of the sampled pulse data 420-1 is thirty-percent lower than the lower threshold 512, then the bias voltage 502-44 is increased by thirty percent. The lower threshold 512 can also include multiple thresholds and the bias voltage 502-22 can be adjusted according to which upper thresholds are not exceeded.

In the depicted example, the bias voltage 502-44 for the other pulses 308-2 to 308-4 in the object pixel 306-44 is increased by approximately fifty percent. As a result, the sensitivity of the photodetector 402 is increased by approximately fifty percent for the pulses 308-2 to 308-4. The increase of the bias voltage 502-44 improves the ability of the photodetector 402 to detect the other pulses 308-2 to 308-4. The increased sensitivity can allow the lidar system 102 to differentiate the other pulses 308-2 to 308-4 from internal noise of the lidar system 102 or improve the accuracy of the lidar data 416.

The value of the lower threshold 512 can be set based on the minimum incident-energy capacity of the photodetector 402. The minimum incident-energy capacity of the photodetector 402 is the minimum incident-energy that produces accurate lidar data 416 for the lidar system 102. Below the minimum incident-energy level, the lidar system 102 may not be able to confidently resolve the pulses 308 from internal noise. In the depicted example, the lower threshold 512 is set as the minimum incident-energy capacity of the photodetector 402.

By adjusting the bias voltage 502 of the photodetector 402 for the subsequent pulses 308-2 to 308-N of a return signal 304 for each object pixel 306, the dynamic range of the lidar system 102 is increased. For example, the dynamic range of the lidar system 102 can be increased by at least a factor of ten. The bias-voltage adjustments allow the lidar system 102 to maintain accurate intensity measurements in close-range and/or high-reflectivity scenarios, while increasing its sensitivity to return signals 304 for long-range and/or low-reflectivity scenarios.

Example Method

Figure 6:
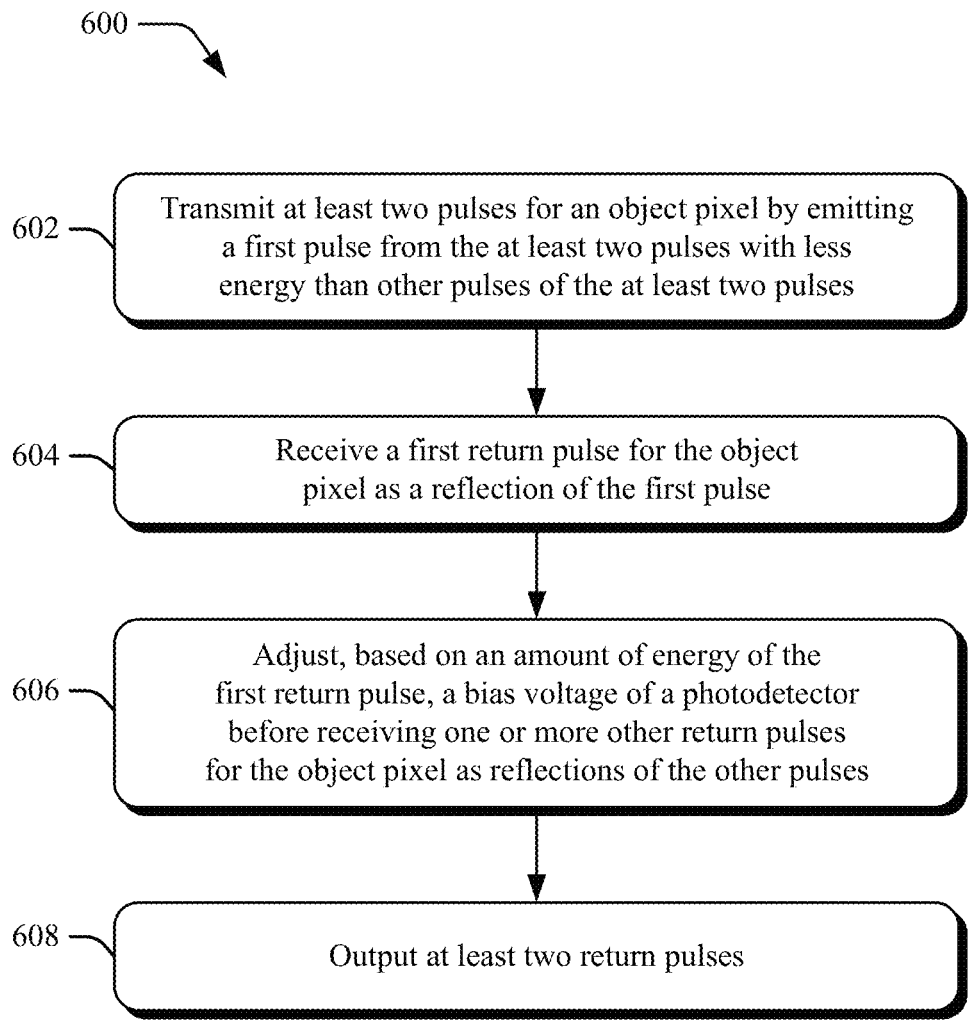
FIG. 6 illustrates an example method performed by a ToF lidar system with an increased dynamic range.

FIG. 6 depicts an example method 600 for increasing the dynamic range of a ToF lidar system. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environments 100 and 300 of FIGS. 1 and 3-1, respectively, and entities detailed in FIGS. 1 through 5, reference to which is made for example only. The techniques are not limited to performance by one entity or multiple entities.

At 602, at least two pulses for an object pixel are transmitted. A first pulse from the at least two pulses is emitted with less energy than other pulses of the at least two pulses. For example, the transmitter 210 of the lidar system 102 on the vehicle 104 transmits, for the object pixel 306-11, the transmit signal 302-11, as shown in FIG. 3-1. The transmit signal 302-11 includes a pulse train of at least two pulses 308 (e.g., the pulses 308-1 to 308-4). The first pulse 308-1 has less energy than the other pulses 308-2, 308-3, and 308-4.

At 604, a first return pulse for the object pixel is received as a reflection of the first pulse. The first return pulse is received using a photodetector configured to sense reflections of the at least two pulses. For example, the photodetector 402 of the receiver 212 of the lidar system 102 receives, for the object pixel 306-11, the return signal 304-11, as shown in FIG. 3-1. The return signal 304-11 includes a first return pulse 308-1.

At 606, based on an amount of energy of the first return pulse, a bias voltage of the photodetector before receiving one or more other return pulses for the object pixel as reflections of the other pulses is adjusted. For example, the bias voltage of the photodetector 402 of the receiver 212 is increased or decreased for the other pulses 308-2 to 308-4 of the object pixel 306-11. The adjustment of the bias voltage is based on an amount of energy of the first return pulse 308-1 of the return signal 304-11, as described with respect to FIG. 5.

At 608, at least two return pulses are output. For example, the intensity readout module 214 of the lidar system 102 outputs the intensity data 412 associated with the pulses 308 of the return signal 304-11 to the processor 216 of the lidar system 102.

EXAMPLES

In the following section, examples are provided.

Example 1

A transceiver of a lidar system configured to: transmit at least two pulses for an object pixel by emitting a first pulse from the at least two pulses with less energy than other pulses of the at least two pulses; receive, using a photodetector configured to sense reflections of the at least two pulses, a first return pulse for the object pixel as a reflection of the first pulse; adjust, based on an amount of energy of the first return pulse, a bias voltage of the photodetector before receiving one or more other return pulses for the object pixel as reflections of the other pulses; and output, to a processor of the lidar system, at least two return pulses including the first return pulse for the object pixel and the one or more other return pulses for the object pixel.

Example 2

The transceiver of example 1, wherein the transceiver is configured to adjust the bias voltage of the photodetector by: increasing the bias voltage of the photodetector when the energy of the first return pulse is less than a lower threshold value; or decreasing the bias voltage of the photodetector when the energy of the first return pulse is greater than an upper threshold value.

Example 3

The transceiver of example 2, wherein the lower threshold value comprises a minimum incident-energy capacity of the photodetector and the upper threshold value comprises less than a maximum incident-energy capacity of the photodetector.

Example 4

The transceiver of example 2, wherein the bias voltage is increased or decreased by a set amount, the set amount comprises half the bias voltage of the photodetector before receiving one or more other return pulses for the object pixel.

Example 5

The transceiver of example 2, wherein the transceiver is further configured to adjust the bias voltage of the photodetector by: in increasing the bias voltage of the photodetector, increase the bias voltage by a first amount, the first amount based on a ratio of the energy of the first return pulse to the upper threshold value; and in decreasing the bias voltage of the photodetector, decrease the bias voltage by a second amount, the second amount based on a ratio of the energy of the first return pulse to the lower threshold value.

Example 6

The transceiver of example 1, wherein the transceiver is further configured to adjust the bias voltage of the photodetector by adjusting the bias voltage of the photodetector proportional to a ratio between the energy of the first return pulse and a threshold value.

Example 7

The transceiver of example 6, wherein the threshold value comprises less than half of a maximum incident-energy capacity of the photodetector.

Example 8

The transceiver of example 1, further configured to: output the return pulses as a consolidated return signal for the object pixel.

Example 9

The transceiver of example 1, wherein the photodetector comprises a silicon photomultiplier, an avalanche photodiode, a single-photon avalanche diode, a photomultiplier tube, or a PIN diode.

Example 10

The transceiver of example 1, wherein the at least two pulses for the object pixel include at least four pulses for the object pixel.

Example 11

The transceiver of example 1, wherein the amount of energy of the first pulse is approximately half of an amount of energy of each of the other pulses.

Example 12

A method comprising: transmitting, by a transceiver of a lidar system, at least two pulses for an object pixel by emitting a first pulse from the at least two pulses with less energy than other pulses of the at least two pulses; receiving, using a photodetector of the transceiver, a first return pulse for the object pixel as a reflection of the first pulse; adjusting, based on an amount of energy of the first return pulse, a bias voltage of the photodetector before receiving one or more other return pulses for the object pixel as reflections of the other pulses; and outputting, to a processor of the lidar system, at least two return pulses including the first return pulse for the object pixel and the one or more other return pulses for the object pixel.

Example 13

The method of example 12, wherein the adjusting of the bias voltage of the photodetector before receiving one or more other return pulses for the object pixel as reflections of the other pulses comprises: increasing the bias voltage of the photodetector when the energy of the first return pulse is less than a lower threshold value; or decreasing the bias voltage of the photodetector when the energy of the first return pulse is greater than an upper threshold value.

Example 14

The method of example 13, wherein the lower threshold value comprises a minimum incident-energy capacity of the photodetector and the upper threshold value comprises less than a maximum incident-energy capacity of the photodetector.

Example 15

The method of example 13, wherein the bias voltage is increased or decreased by a set amount, the set amount comprises half the bias voltage of the photodetector before receiving one or more other return pulses for the object pixel.

Example 16

The method of example 13, further comprising: in increasing the bias voltage of the photodetector, increasing the bias voltage by a first amount, the first amount based on a ratio of the energy of the first return pulse to the lower threshold value; and in decreasing the bias voltage of the photodetector, decreasing the bias voltage by a second amount, the second amount based on a ratio of the energy of the first return pulse to the upper threshold value.

Example 17

The method of example 12, wherein the adjusting of the bias voltage of the photodetector before receiving one or more other return pulses for the object pixel comprises adjusting the bias voltage of the photodetector proportional to a ratio between the energy of the first return pulse and a threshold value, the threshold value comprises less than half of a maximum incident-energy capacity of the photodetector.

Example 18

The method of example 12 further comprising: outputting the return pulses as a consolidated return signal for the object pixel.

Example 19

The method of example 12, wherein the at least two pulses for the object pixel include at least four pulses for the object pixel.

Example 20

A lidar system comprising: means for transmitting at least two pulses for an object pixel by emitting a first pulse from the at least two pulses with less energy than other pulses of the at least two pulses; means for receiving a first return pulse for the object pixel as a reflection of the first pulse; means for adjusting, based on an amount of energy of the first return pulse, a bias voltage of the means for receiving before receiving one or more other return pulses for the object pixel as reflections of the other pulses; and means for outputting at least two return pulses including the first return pulse for the object pixel and the one or more other return pulses for the object pixel.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A transceiver of a lidar system configured to:
transmit at least two pulses for an object pixel within a field-of-view of the lidar system by emitting a first pulse from the at least two pulses with less energy than other pulses of the at least two pulses;
receive, using a photodetector configured to sense reflections of the at least two pulses, a first return pulse for the object pixel as a reflection of the first pulse, the first return pulse being reflected by an object within the field-of-view of the lidar system;
adjust, based on an amount of energy of the first return pulse, a bias voltage of the photodetector before receiving one or more other return pulses for the object pixel as reflections of the other pulses by the object; and
output, to a processor of the lidar system, at least two return pulses including the first return pulse for the object pixel and the one or more other return pulses for the object pixel.

2. The transceiver of claim 1, wherein the transceiver is configured to adjust the bias voltage of the photodetector by:
increasing the bias voltage of the photodetector when the amount of energy of the first return pulse is less than a lower threshold value; or
decreasing the bias voltage of the photodetector when the amount of energy of the first return pulse is greater than an upper threshold value.

3. The transceiver of claim 2, wherein the lower threshold value comprises a minimum incident-energy capacity of the photodetector and the upper threshold value comprises less than a maximum incident-energy capacity of the photodetector.

4. The transceiver of claim 2, wherein the bias voltage is increased or decreased by a set amount, the set amount comprises half the bias voltage of the photodetector before receiving one or more other return pulses for the object pixel.

5. The transceiver of claim 2, wherein the transceiver is further configured to adjust the bias voltage of the photodetector by:
in increasing the bias voltage of the photodetector, increase the bias voltage by a first amount, the first amount based on a ratio of the amount of energy of the first return pulse to the upper threshold value; and
in decreasing the bias voltage of the photodetector, decrease the bias voltage by a second amount, the second amount based on a ratio of the amount of energy of the first return pulse to the lower threshold value.

6. The transceiver of claim 1, wherein the transceiver is further configured to adjust the bias voltage of the photodetector by adjusting the bias voltage of the photodetector proportional to a ratio between the amount of energy of the first return pulse and a threshold value.

7. The transceiver of claim 6, wherein the threshold value comprises less than half of a maximum incident-energy capacity of the photodetector.

8. The transceiver of claim 1, further configured to: output the at least two return pulses as a consolidated return signal for the object pixel.

9. The transceiver of claim 1, wherein the photodetector comprises a silicon photomultiplier, an avalanche photodiode, a single-photon avalanche diode, a photomultiplier tube, or a PIN diode.

10. The transceiver of claim 1, wherein the at least two pulses for the object pixel include at least four pulses for the object pixel.

11. The transceiver of claim 1, wherein the amount of energy of the first pulse is approximately half of an amount of energy of each of the other pulses.

12. A method comprising:
transmitting, by a transceiver of a lidar system, at least two pulses for an object pixel within a field-of-view of the lidar system by emitting a first pulse from the at least two pulses with less energy than other pulses of the at least two pulses;
receiving, using a photodetector of the transceiver, a first return pulse for the object pixel as a reflection of the first pulse, the first return pulse being reflected by an object within the field-of-view of the lidar system;
adjusting, based on an amount of energy of the first return pulse, a bias voltage of the photodetector before receiving one or more other return pulses for the object pixel as reflections of the other pulses by the object; and
outputting, to a processor of the lidar system, at least two return pulses including the first return pulse for the object pixel and the one or more other return pulses for the object pixel.

13. The method of claim 12, wherein the adjusting of the bias voltage of the photodetector before receiving one or more other return pulses for the object pixel as reflections of the other pulses comprises:
increasing the bias voltage of the photodetector when the amount of energy of the first return pulse is less than a lower threshold value; or
decreasing the bias voltage of the photodetector when the amount of energy of the first return pulse is greater than an upper threshold value.

14. The method of claim 13, wherein the lower threshold value comprises a minimum incident-energy capacity of the photodetector and the upper threshold value comprises less than a maximum incident-energy capacity of the photodetector.

15. The method of claim 13, wherein the bias voltage is increased or decreased by a set amount, the set amount comprises half the bias voltage of the photodetector before receiving one or more other return pulses for the object pixel.

16. The method of claim 13, further comprising:
in increasing the bias voltage of the photodetector, increasing the bias voltage by a first amount, the first amount based on a ratio of the amount of energy of the first return pulse to the lower threshold value; and in decreasing the bias voltage of the photodetector, decreasing the bias voltage by a second amount, the second amount based on a ratio of the amount of energy of the first return pulse to the upper threshold value.

17. The method of claim 12, wherein the adjusting of the bias voltage of the photodetector before receiving one or more other return pulses for the object pixel comprises adjusting the bias voltage of the photodetector proportional to a ratio between the amount of energy of the first return pulse and a threshold value, the threshold value comprises less than half of a maximum incident-energy capacity of the photodetector.

18. The method of claim 12 further comprising: outputting the at least two return pulses as a consolidated return signal for the object pixel.

19. The method of claim 12, wherein the at least two pulses for the object pixel include at least four pulses for the object pixel.

20. A lidar system comprising:

means for transmitting at least two pulses for an object pixel within a field-of-view of the lidar system by emitting a first pulse from the at least two pulses with less energy than other pulses of the at least two pulses;

means for receiving a first return pulse for the object pixel as a reflection of the first pulse, the first return pulse being reflected by an object within the field-of-view of the lidar system;

means for adjusting, based on an amount of energy of the first return pulse, a bias voltage of the means for receiving before receiving one or more other return pulses for the object pixel as reflections of the other pulses by the object; and means for outputting at least two return pulses including the first return pulse for the object pixel and the one or more other return pulses for the object pixel.

* * * * *